US012299982B2

(12) United States Patent
Gao et al.

(10) Patent No.: US 12,299,982 B2
(45) Date of Patent: May 13, 2025

(54) SYSTEMS AND METHODS FOR PARTIALLY SUPERVISED ONLINE ACTION DETECTION IN UNTRIMMED VIDEOS

(71) Applicant: Salesforce, Inc., San Francisco, CA (US)

(72) Inventors: Mingfei Gao, Sunnyvale, CA (US); Yingbo Zhou, Mountain View, CA (US); Ran Xu, Mountain View, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 911 days.

(21) Appl. No.: 16/931,228

(22) Filed: Jul. 16, 2020

(65) Prior Publication Data

US 2021/0357687 A1 Nov. 18, 2021

Related U.S. Application Data

(60) Provisional application No. 63/023,402, filed on May 12, 2020.

(51) Int. Cl.
*G06V 20/40* (2022.01)
*G06F 17/18* (2006.01)
(Continued)

(52) U.S. Cl.
CPC .............. *G06V 20/44* (2022.01); *G06F 17/18* (2013.01); *G06F 18/2113* (2023.01);
(Continued)

(58) Field of Classification Search
CPC ...... G06V 20/44; G06V 10/764; G06V 10/82; G06V 20/20; G06V 20/40; G06F 17/18;
(Continued)

(56) References Cited

U.S. PATENT DOCUMENTS 9,432,671 B2   8/2016   Campanelli et al.
10,282,663 B2   5/2019   Socher et al.
(Continued)

OTHER PUBLICATIONS

Shou, Zheng, et al. "Online action detection in untrimmed, streaming videos-modeling and evaluation." ECCV. vol. 1. No. 2. 2018. (Year: 2018).*

(Continued)

*Primary Examiner* — Miranda M Huang
*Assistant Examiner* — Sidney Vincent Bostwick
(74) *Attorney, Agent, or Firm* — Haynes and Boone LLP

(57) ABSTRACT

Embodiments described herein provide systems and methods for a partially supervised training model for online action detection. Specifically, the online action detection framework may include two modules that are trained jointly—a Temporal Proposal Generator (TPG) and an Online Action Recognizer (OAR). In the training phase, OAR performs both online per-frame action recognition and start point detection. At the same time, TPG generates class-wise temporal action proposals serving as noisy supervisions for OAR. TPG is then optimized with the video-level annotations. In this way, the online action detection framework can be trained with video-category labels only without pre-annotated segment-level boundary labels.

20 Claims, 8 Drawing Sheets

(51) Int. Cl.
  *G06F 18/2113* (2023.01)
  *G06F 18/214* (2023.01)
  *G06F 18/2431* (2023.01)
  *G06N 3/084* (2023.01)
  *G06V 10/764* (2022.01)
  *G06V 10/82* (2022.01)
  *G06V 20/20* (2022.01)

(52) U.S. Cl.
  CPC ........ *G06F 18/214* (2023.01); *G06F 18/2431* (2023.01); *G06N 3/084* (2013.01); *G06V 10/764* (2022.01); *G06V 10/82* (2022.01); *G06V 20/20* (2022.01); *G06V 20/40* (2022.01)

(58) Field of Classification Search
  CPC ............... G06F 18/2113; G06F 18/214; G06F 18/2431; G06N 3/084; G06N 3/044; G06N 3/048
  See application file for complete search history.

(56) References Cited

U.S. PATENT DOCUMENTS

| | | | |
|---|---|---|---|
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 2016/0234464 A1* | 8/2016 | Loce | G06V 20/52 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373682 A1 | 12/2018 | McCann et al. | |
| 2018/0373987 A1 | 12/2018 | Zhang et al. | |
| 2019/0108400 A1* | 4/2019 | Escorcia | G06V 20/41 |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0295530 A1 | 9/2019 | Hosseini-Asl et al. | |
| 2019/0355270 A1 | 11/2019 | McCann et al. | |
| 2019/0362020 A1 | 11/2019 | Paulus et al. | |
| 2020/0005765 A1 | 1/2020 | Zhou et al. | |
| 2020/0057805 A1 | 2/2020 | Lu et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0184020 A1 | 6/2020 | Hashimoto et al. | |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0302178 A1 | 9/2020 | Gao et al. | |
| 2020/0302236 A1 | 9/2020 | Gao et al. | |

OTHER PUBLICATIONS

Xu, Mingze, et al. "Temporal recurrent networks for online action detection." Proceedings of the IEEE/CVF international conference on computer vision. 2019. (Year: 2019).*
Song, Xiaolin, et al. "Temporal-spatial mapping for action recognition." IEEE Transactions on Circuits and Systems for Video Technology 30.3 (2019): 748-759. (Year: 2019).*
Yoshikawa, Taizo, Viktor Losing, and Emel Demircan. "Machine learning for human movement understanding." Advanced Robotics 34.13 (2020): 828-844. (Year: 2020).*
Parsa, Behnoosh, et al. "Predicting ergonomic risks during indoor object manipulation using spatiotemporal convolutional networks." CORR. 2019. (Year: 2019).*
Tang, Fengxiao, et al. "On extracting the spatial-temporal features of network traffic patterns: A tensor based deep learning model." 2018 International Conference on Network Infrastructure and Digital Content (IC-NIDC). IEEE, 2018. (Year: 2018).*
Eliáš, RNDr Petr. "Action Recognition, Annotation, and Searching in Motion Data." (Year: 2019).*
Liu, Jiaying, et al. "Multi-modality multi-task recurrent neural network for online action detection." IEEE Transactions on Circuits and Systems for Video Technology 29.9 (2018): 2667-2682. (Year: 2018).*
Mahmud, Tahmida, Mahmudul Hasan, and Amit K. Roy-Chowdhury. "Joint prediction of activity labels and starting times in untrimmed videos." Proceedings of the IEEE International conference on Computer Vision. 2017. (Year: 2017).*
P. Bojanowski, et al. Weakly supervised action labeling in videos under ordering constraints. In European Conference on Computer Vision, pp. 628-643. Springer, 2014.
S. Buch, V. Escorcia, C. Shen, B. Ghanem, and J. C. Niebles. SST: Single-stream temporal action proposals. In CVPR, 2017.
J. Carreira and A. Zisserman. Quo vadis, action recognition? a new model and the kinetics dataset. In CVPR, 2017.
Y.-W. Chao, S. Vijayanarasimhan, B. Seybold, D. A. Ross, J. Deng, and R. Sukthankar. Rethinking the faster r-cnn architecture for temporal action localization. In CVPR, 2018.
X. Dai, B. Singh, G. Zhang, L. S. Davis, and Y. Q. Chen. Temporal context network for activity localization in videos. In ICCV, 2017.
R. De Geest, E. Gavves, A. Ghodrati, Z. Li, C. Snoek, and T. Tuytelaars. Online action detection. In ECCV, 2016.; arxiv:1604.06506v2 [cs.CV] Aug. 30, 2016.
O. Duchenne, I. Laptev, J. Sivic, F. R. Bach, and J. Ponce. Automatic annotation of human actions in video. In ICCV, vol. 1, pp. 3-2, 2009.
B. G. Fabian Caba Heilbron, Victor Escorcia and J. C. Niebles. Activitynet: A large-scale video benchmark for human activity understanding. In CVPR, 2015.
J. Gao, Z. Yang, and R. Nevatia. RED: Reinforced encoder-decoder networks for action anticipation. In BMVC, 2017.
J. Gao, Z. Yang, C. Sun, K. Chen, and R. Nevatia. TURN TAP: Temporal unit regression network for temporal action proposals. ICCV, 2017.

(56) References Cited

OTHER PUBLICATIONS

M. Gao, M. Xu, L. S. Davis, R. Socher, and C. Xiong. Startnet: Online detection of action start in untrimmed videos. In IEEE International Conference on Computer Vision (ICCV), 2019.

D.-A. Huang, L. Fei-Fei, and J. C. Niebles. Connectionist temporal modeling for weakly supervised action labeling. In European Conference on Computer Vision, pp. 137-153. Springer, 2016.

Y.-G. Jiang, J. Liu, A. Roshan Zamir, G. Toderici, I. Laptev, M. Shah, and R. Sukthankar. THUMOS challenge: Action recognition with a large No. of classes. http://crcv.ucf.edu/THUMOS14/, 2014.

D. P. Kingma and J. Ba. Adam: A method for stochastic optimization. arXiv:1412.6980, 2014.

T. N. Kipf and M. Welling. Semi-supervised classification with graph convolutional networks. arXiv preprint arXiv:1609.02907, 2016.

P. Lee, Y. Uh, and H. Byun. Background suppression network for weakly-supervised temporal action localization. In AAAI, 2020.

T.-Y. Lin, P. Goyal, R. Girshick, K. He, and P. Dollár. Focal loss for dense object detection. In Proceedings of the IEEE international conference on computer vision, pp. 2980-2988, 2017.

D. Liu, T. Jiang, and Y. Wang. Completeness modeling and context separation for weakly supervised temporal action localization. In The IEEE Conference on Computer Vision and Pattern Recognition (CVPR), Jun. 2019.

S. Narayan, H. Cholakkal, F. Shahbaz Khan, and L. Shao. 3c-net: Category count and center loss for weakly-supervised action localization. arXiv preprint arXiv:1908.08216, 2019.

S. Paul, S. Roy, and A. K. Roy-Chowdhury. W-talc: Weakly-supervised temporal activity localization and classification. In Proceedings of the European Conference on Computer Vision (ECCV), pp. 563-579, 2018.

Z. Shou, H. Gao, L. Zhang, K. Miyazawa, and S.-F. Chang. Autoloc: Weakly-supervised temporal action localization in untrimmed videos. In Proceedings of the European Conference on Computer Vision (ECCV), pp. 154-171, 2018.

Z. Shou, J. Pan, J. Chan, K. Miyazawa, H. Mansour, A. Vetro, X. Giro-i Nieto, and S.-F. Chang. Online action detection in untrimmed, streaming videos-modeling and evaluation. In ECCV, 2018.

Z. Shou, D. Wang, and S.-F. Chang. Temporal action localization in untrimmed videos via multi-stage cnns. In CVPR, 2016.

L. Wang, Y. Xiong, D. Lin, and L. Van Gool. Untrimmednets for weakly supervised action recognition and detection. In Proceedings of the IEEE Conference on Computer Vision and Pattern Recognition, pp. 4325-4334, 2017.

H. Xu, A. Das, and K. Saenko. R-C3D: Region convolutional 3d network for temporal activity detection. In ICCV, 2017.

M. Xu, M. Gao, Y.-T. Chen, L. S. Davis, and D. J. Crandall. Temporal recurrent networks for online action detection. In IEEE International Conference on Computer Vision (ICCV), 2019.

Y. Yuan, Y. Lyu, X. Shen, I. W. Tsang, and D.-Y. Yeung. Marginalized average attentional network for weakly-supervised learning. In International Conference on Learning Representations (ICLR), 2019.

R. Zeng, W. Huang, M. Tan, Y. Rong, P. Zhao, J. Huang, and C. Gan. Graph convolutional networks for temporal action localization. In Proceedings of the IEEE International Conference on Computer Vision, pp. 7094-7103, 2019.

Y. Zhao, Y. Xiong, L. Wang, Z. Wu, X. Tang, and D. Lin. Temporal action detection with structured segment networks. In ICCV, 2017.

\* cited by examiner

| Methods | Sup. | Feat. | Mean P-AP@ Time Threshold (Seconds) | | | | | | | | | |
|---|---|---|---|---|---|---|---|---|---|---|---|---|
| | | | 1 | 2 | 3 | 4 | 5 | 6 | 7 | 8 | 9 | 10 |
| *Shou et al.* | S | TS | 3.1 | 4.3 | 4.7 | 5.4 | 5.8 | 6.1 | 6.5 | 7.2 | 7.6 | 8.2 |
| StartNet | S | TS | 19.5 | 27.2 | 30.8 | 33.9 | 36.5 | 37.5 | 38.3 | 38.8 | 39.5 | 39.8 |
| | | I3D | 21.9 | 33.5 | 39.6 | 42.5 | 46.2 | 46.6 | 47.7 | 48.3 | 48.6 | 49.0 |
| OAD | V | I3D | 21.9 | 32.9 | 40.5 | 44.4 | 48.1 | 49.8 | 50.8 | 51.7 | 52.4 | 53.1 |
| | S | | 28.0 | 40.6 | 45.7 | 48.0 | 50.1 | 51.0 | 51.9 | 52.4 | 53.0 | 53.1 |

FIG. 6A

| Methods | Sup. | Feat. | Mean P-AP@ Time Threshold (Seconds) | | | | | | | | | |
|---|---|---|---|---|---|---|---|---|---|---|---|---|
| | | | 1 | 2 | 3 | 4 | 5 | 6 | 7 | 8 | 9 | 10 |
| StartNet | S | I3D | 7.5 | 11.5 | 14.1 | 16.5 | 18.4 | 19.7 | 20.9 | 21.8 | 22.9 | 23.6 |
| OAD | V | I3D | 7.9 | 11.6 | 14.3 | 16.4 | 18.8 | 20.3 | 22.2 | 23.4 | 24.7 | 25.3 |
| | S | | 8.7 | 13.6 | 17.0 | 19.7 | 21.6 | 23.0 | 24.7 | 25.8 | 26.8 | 27.7 |

FIG. 6B

| Methods | Supervision | Feature | Parameter # | Inference time | mean F-AP |
|---|---|---|---|---|---|
| RED | S | TS | – | – | 45.3 |
| TRN | | TS | – | – | 47.2 |
| | | I3D | 314M | 2.60 ms | 51.0 |
| OAD | V | I3D | 110M | 0.40 ms | 54.4 |

FIG. 7A

| Methods → | TRN | OAD | | | | |
|---|---|---|---|---|---|---|
| Supervision → | S | V | V+30%S | V+50%S | V+70%S | S |
| mean F-AP → | 69.1 | 66.7 | 66.9 | 68.5 | 69.3 | 70.7 |

FIG. 7B

| Methods → | TRN | OAD | | | | |
|---|---|---|---|---|---|---|
| Supervision → | S | V | V+10%S | V+30%S | V+50%S | S |
| mean F-AP → | 51.0 | 54.4 | 55.0 | 59.3 | 62.6 | 67.1 |

FIG. 8A

| Methods | Supervision | Feature | mean F-AP | mean P-AP@1 |
|---|---|---|---|---|
| OAD | | UNT | 46.3 | 16.4 |
| TPG only | V | I3D | 48.0 | 16.2 |
| W/O $st_i^c$ (Infer.) | | | 54.4 | 20.2 |
| W/O temp. pool | | | 54.3 | 21.6 |
| OAD | | | 54.4 | 21.9 |
| W/O $L_{TPG}$ | S | I3D | 61.2 | 24.5 |
| W/O weak sup. | | | 63.9 | 25.4 |
| W/O temp. pool | | | 65.6 | 26.3 |
| OAD | | | 67.1 | 28.0 |

FIG. 8B

SYSTEMS AND METHODS FOR PARTIALLY SUPERVISED ONLINE ACTION DETECTION IN UNTRIMMED VIDEOS

RELATED APPLICATIONS

This application claims priority to U.S. Provisional Patent Application No. 63/023,402, filed May 12, 2020, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to partially supervised online action detection in untrimmed videos.

BACKGROUND

Temporal action localization is often applied to detect temporal action boundaries in long, untrimmed videos. Traditionally, temporal action detection is performed offline when the entire video can be observed before making decisions. Such offline analysis for action start detection usually require information from the video segments after the action start. In some time-sensitive scenarios, however, an accurate action start of a particular action is identified in real time. For example, an autonomous driving car should detect the start of the action of "pedestrian crossing" as soon as the action happens to avoid collision. For another example, a surveillance system should detect the start of an action of "trespasser entering premises" to generate an immediate alert. Some systems apply online action detection to identify actions occurring at the current time without having access to the future video information. However, these online detection systems often rely on segment-level annotated data for training, e.g., the start and end times of each action in the training video segment. Annotating temporal action boundaries (the start and end times of an action) in long, untrimmed videos can be expensive and time-consuming, thus hindering the scalability of the online action detection systems.

Therefore, there is a need for efficient training for online action detection systems.

BRIEF DESCRIPTION OF THE DRAWINGS

FIGS. 6A-6B shows data tables illustrating example performance of the OAD module using different datasets as training data, according to one embodiment.

FIGS. 7A-7B provide example data tables illustrating performance of online per-frame action recognition, according to one embodiment.

FIGS. 8A-8B show example performance of the OAD module trained with a combination of partial supervision and strong supervision, according to one embodiment.

Figure 1:
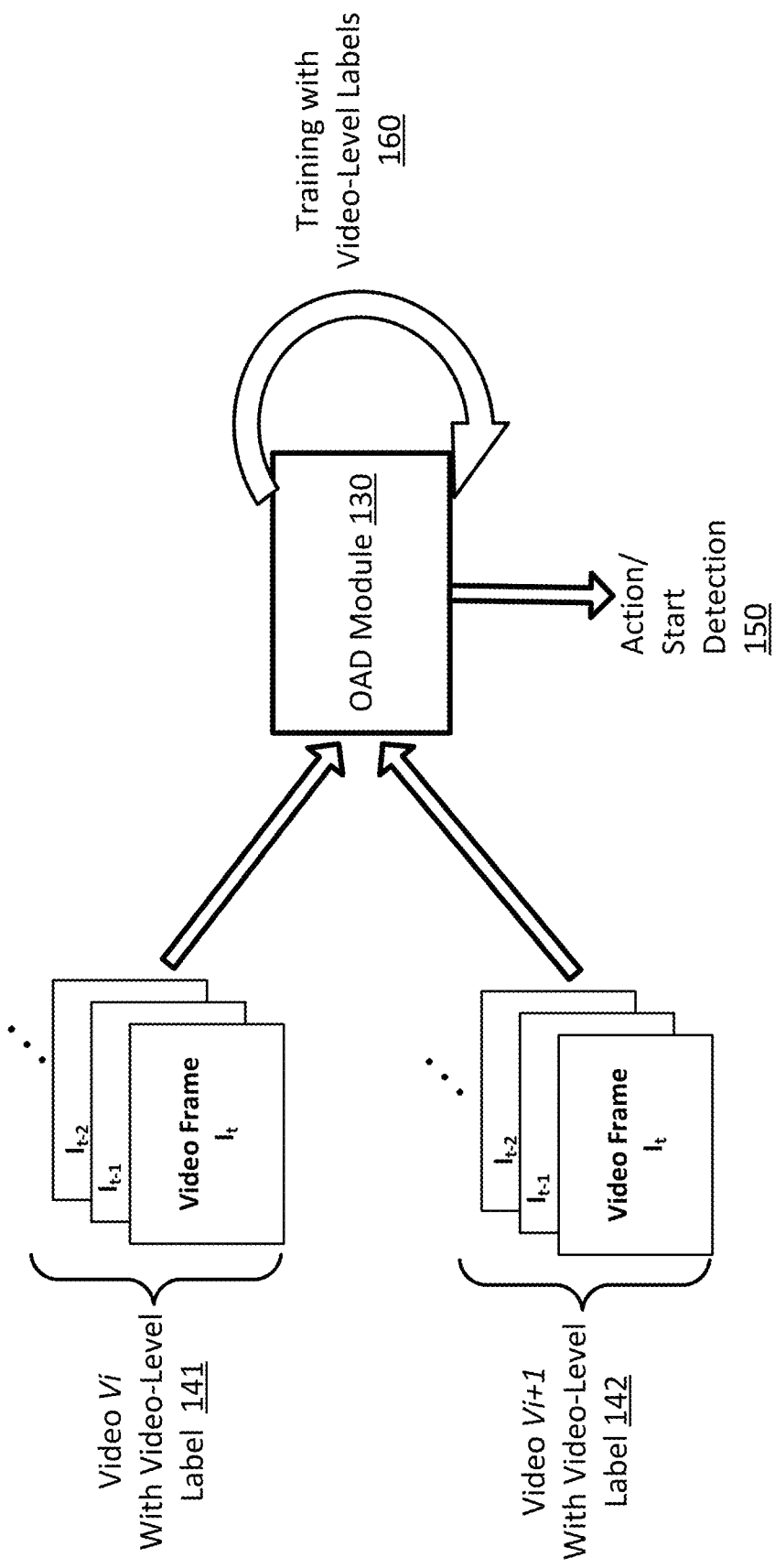
FIG. 1 is a simplified diagram illustrating training an online action detection (OAD) module with video-level labels, according to one embodiment.

In the figures and appendix, elements having the same designations have the same or similar functions.

DETAILED DESCRIPTION

Existing online action detection (OAD) systems rely on segment-level annotated data for training, e.g., the start and end times of each action is often required to be pre-annotated in training videos. However, annotating temporal action boundaries in long, untrimmed videos requires significant amount of time and human labor, and thus hinders the scalability of online action detection systems. On the other hand, compared to the segment-level boundaries (e.g., the start and end times of each action), video-level action class labels (i.e. categories of actions that emerge in a video without temporal information) are much less costly to obtain. For example, with the help of text-based video retrieval techniques, action class labels, e.g., "lifting," "jumping," "rolling," etc., may be obtained with relatively insignificant cost from online sources.

In view of the inefficiency of existing supervised training for online action detection systems, embodiments described herein provide a partially supervised training model for online action detection. Specifically, the online action detection framework may include two modules that are trained jointly—a Temporal Proposal Generator (TPG) and an Online Action Recognizer (OAR). In the training phase, OAR performs both online per-frame action recognition and start point detection. At the same time, TPG generates class-wise temporal action proposals serving as noisy supervisions for OAR. TPG is then optimized with the video-level annotations. In this way, the online action detection framework can be trained with video-category labels only without pre-annotated segment-level boundary labels.

In some embodiments, when some training videos containing strong annotations are available, the partially supervised training using only video-category labels and supervised training using the strong annotations can be combined to improve model performance.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "partially" is used to refer to something that is to a limited extent. For example, a partially annotated video may be annotated with only a certain type of labels (e.g., video-level action class labels, etc.), while absent another type of labels (e.g., the usually costly segment-level labels, etc.). Namely, partially supervised training is used to refer to a training mechanism using only training data with one or more limited types of annotated labels. For example, with embodiments described herein, partially supervised online action detection is used to refer to an online action detection mechanism that is trained using untrimmed videos annotated with only video-level action class labels but without segment-level boundaries (e.g., the start and end times of each action).

Overview

FIG. 1 is a simplified diagram illustrating training an OAD module with video-level labels, according to one embodiment. To take advantage of the easy-to-obtain video-level annotations, FIG. 1 shows a partially supervised OAD framework, that can be trained with video-class labels only. For example, training videos 141, 142, which are pre-annotated with video-level labels only, are input to the OAD module 130 as training videos. The input videos 141-142 may only contain labels indicating that the respective video contains an action class such as "rolling," "jumping," "lifting," and/or the like. The input videos 141-142 may not contain any segment-level label, e.g., no pre-annotated label indicating whether a specific video frame $I_t$ contains an action start of a specific action class.

The OAD module 130 is configured to receive an input of untrimmed videos and generate an output 150, which may include probabilities of an action start corresponding to action classes, per-frame action classification, and/or the like. In some embodiments, the OAD module 130 receives an input of a streaming video and outputs the action start probabilities corresponding to action classes and/or action classification probabilities 150 at each time t, without future information of the streaming video. Detecting actions using partial supervision in an online scenario may be challenging, because (1) online action detectors generally require per-frame labels for training, so it is hard to utilize video-level labels as supervision and (2) it is not trivial for a model to be accurate for action recognition and sensitive to action starts without access to future information.

Embodiments described herein provide a training mechanism for the OAD module 130 to train with video-level labels, e.g., shown at process 160, of the input videos 141-142. As further described in FIGS. 3-4B, the OAD module 130 includes two jointly-trained modules, e.g., a Temporal Proposal Generator (TPG) module and Online Action Recognizer (OAR) module. The TPG module, supervised by video-class labels, generates class-wise temporal action proposals, e.g., proposed action starts of each action class, that can be used as pseudo per-frame labels for the OAR module. On the other hand, the OAR module conducts both per-frame action recognition and start point detection jointly in an online fashion. The output of action start probability of each specific action class and/or the per-frame action score 150 may then be used to compute a loss for the OAR module using the pseudo ground truth output from the TPG module. In this way, the OAR module 130 may jointly train the two modules TPG and OAR end-to-end using the video-level labels from the input videos 141-142.

Computing Environment

Figure 2:
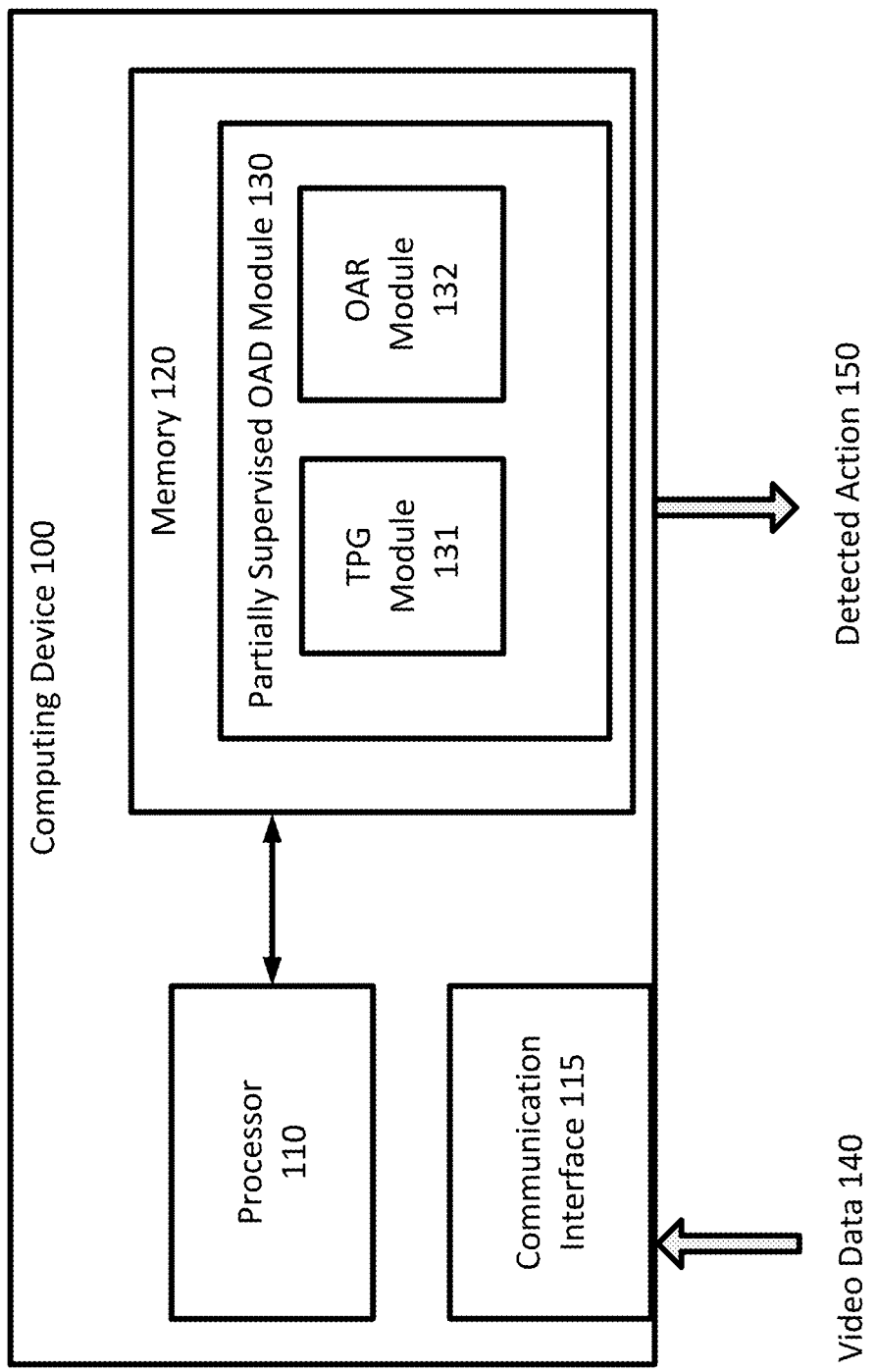
FIG. 2 is a simplified diagram of a computing device for implementing a neural network for online action detection training using partially annotated training data, according to some embodiments.

FIG. 2 is a simplified diagram of a computing device for implementing a neural network for online action detection training using partially annotated training data, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a partially supervised online action detection (OAD) module 130 that may be used to implement and/or emulate the systems and models, and/or to implement any of the methods described further herein. In some examples, the partially supervised OAD module 130 may be used to receive, from a communication interface 115, and handle the input of untrimmed videos 140 and generate an output of the detected action 150 which may include an action class and the start and end times of the specific action. The detected action 150 may be derived from per-frame action scores indicating the classification of action classes of each frame and probabilities indicating a possible action start corresponding to each action class. In some examples, the partially supervised OAD module 130 may also handle the iterative training and/or evaluation of a system or model used for action detection tasks.

In some embodiments, the partially supervised OAD module 130 includes a TPG module 131 and an OAR module 132. The modules and/or submodules 131-132 may be serially connected or connected in other manners. For example, the TPG module 131 may generate temporal proposals from the input of videos 140 and send to the OAR module 132. In some examples, the partially supervised OAD module 130 and the sub-modules 131-132 may be implemented using hardware, software, and/or a combination of hardware and software. Further structural and functional details of the TPG module 131 and the OAR module 132 are described in relation to FIGS. 3-5.

Partially Supervised OAD Module

Figure 3:
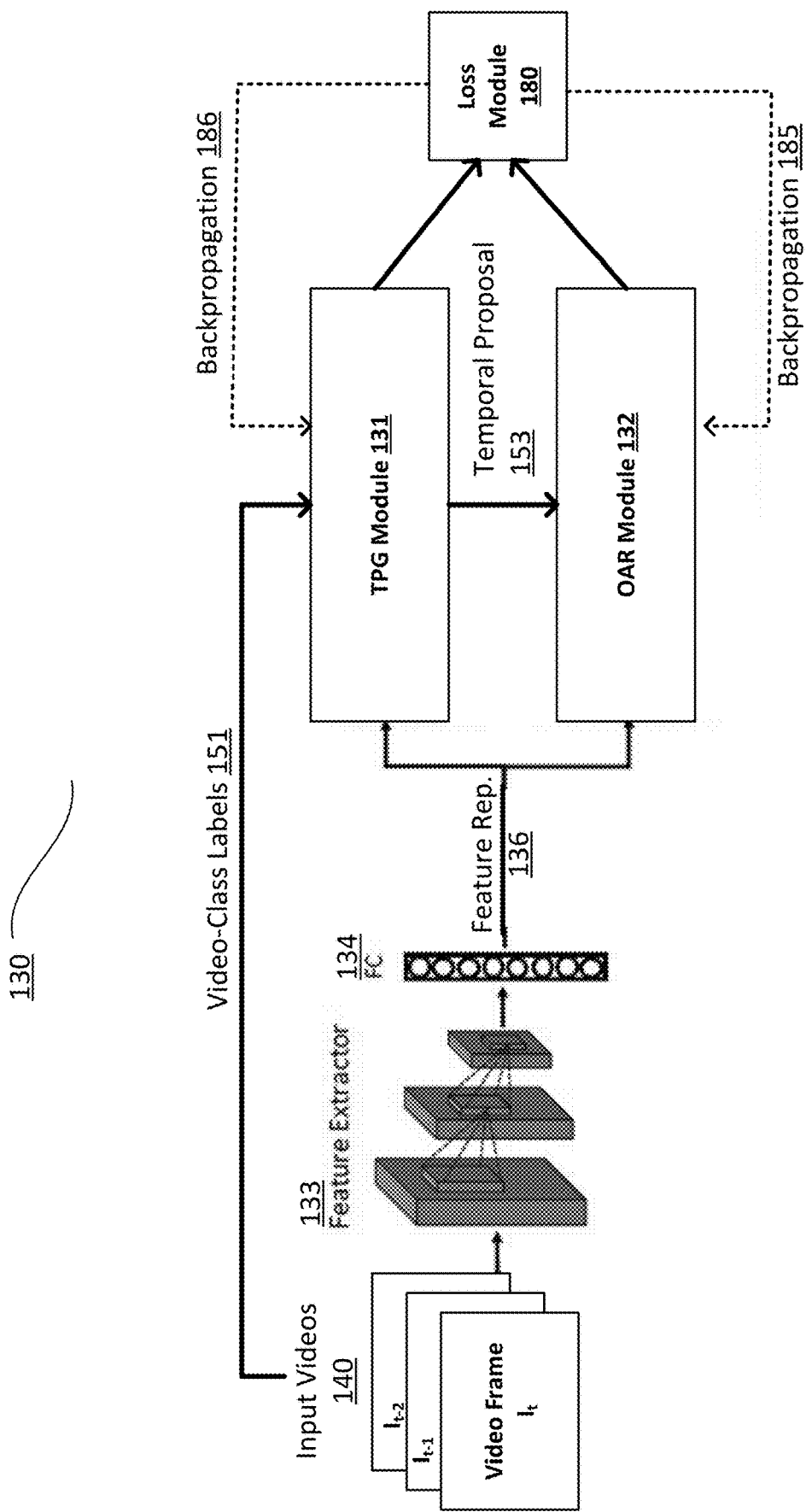
FIG. 3 is a simplified diagram illustrating an example structure of the partially supervised OAD module described in FIGS. 1-2, according to some embodiments.

FIG. 3 is a simplified diagram illustrating an example structure of the partially supervised OAD module 130 described in FIGS. 1-2, according to some embodiments. As shown in FIG. 3, for online action detection, the input to the OAD module 130 is a streaming, untrimmed video 140, Vi, represented as a sequence of image frames $[I_i^1, I_i^2, \ldots, I_i^{T_i}]$, where i denotes video index and $T_i$ is video length. At each time t, the OAD module 130 takes an image frame $I_i^t$ as input. The OAD module 130 predicts, $a_i^t$, the probability of the current action category (online per-frame action recognition) and determines, $as_i^t$, the probability that an action start occurs (online detection of action start). Under the constraint of online setting, no future information is available in the inference phase.

The OAD module 130 includes a feature extractor 133 used to extract high-dimensional features of the input video 140. Frame feature representations 136, denoted by Fi, are then obtained by a fully connected layer (FC) 134 with ReLU as the activation function. The frame features then serve as inputs to both the TPG module 131 and the OAD module 132.

For example, the feature representations $F_i = [f_i^1, f_i^2, \ldots, f_i^{T_i}] \in \mathbb{R}^{T_i \times D}$ indicates the features of the video Vi, where $f_i^t$ indicates the feature of the frame at time step t, and $T_i$ denotes the number of frames in Vi. The feature representations 136 are provided to the TPG module 131 and the OAR module 132 in parallel.

During training, the TPG module 131 may be supervised by input video 140 with video-class labels only instead of any segment-level labels. The TPG module 131 is configured to output class-wise temporal proposals 153, e.g., categories of detected action start within the video 140. The proposals then serve as pseudo ground truth of action boundaries, which can be used to serve as per-frame labels to supervise the training of the OAR module 132. The output of the TPG module 131 and the OAR module 132 may be provided to a loss module 180 to compute a loss function that is used for end-to-end joint training of the two modules 131-132. For example, the aggregated loss computed by the loss module 180 may be used for backpropagation to update the parameters of the TPG module 131 and the OAR module 132 jointly, e.g., via backpropagation paths 185, 186.

Using the two-module structure, the TPG module 131 may be used only during training for pseudo labels generation, so it can fully utilize temporal relation of frames (e.g. grouping nearby frames of the same class to improve proposal generation) without online constraint. The design of the OAR module 132 can then directly target on improving the online tasks without being distracted by the partially supervised setting. The two-module structure also makes it flexible to take strong annotations when they are available for some videos and the joint end-to-end training can help both the TPG module 131 and the OAR module 132 simultaneously by improving the shared features. On the other hand, TPG module 131 and OAR module 132 can also be viewed as a teacher-student network, where the offline teacher (TPG) generates the temporal proposals as pseudo per-frame labels for OAR using partial supervision, and the online student (OAR) distills knowledge from the teacher via its generated supervisory signal.

In the strongly supervised setting, e.g., when pre-annotated training videos with segment-level labels are available, the weak and strong supervision can be leveraged and/or combined to improve model performance. For example, when only a portion of videos have strong annotations, the two-module structure of the OAD module 130 may combine the weak and strong supervised training, using one batch of training videos having strong annotations for supervised training, and another batch of training videos having weak annotations (video-level labels only) for the partially supervised training as described herein.

During inference, only the OAR module 132 is used for online action detection. Further details of the operations of the TPG module 131 and the OAR module 132 can be found in FIGS. 4A-4B.

Figure 4A:
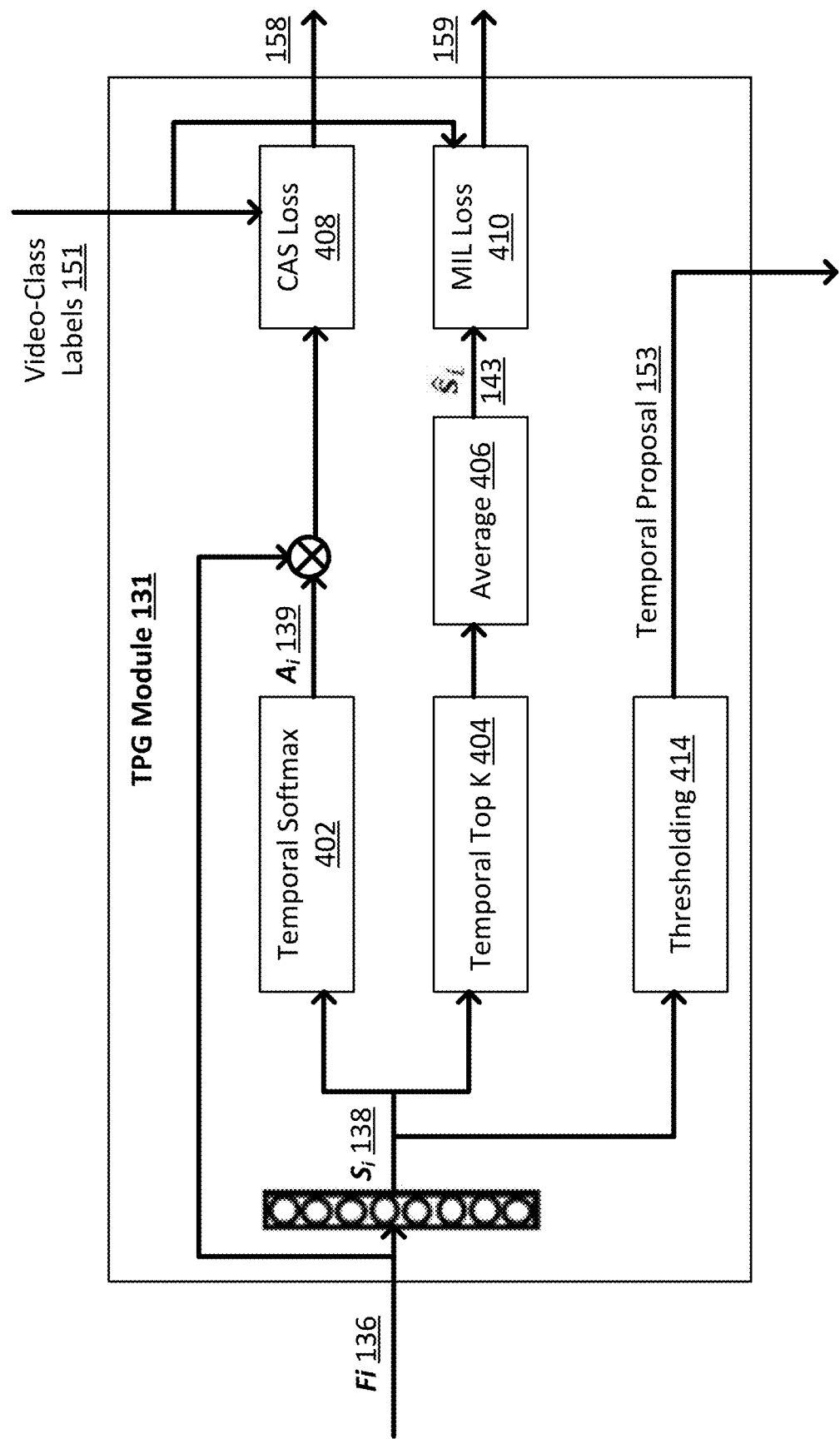
FIG. 4A is a simplified diagram illustrating an example structure of the TPG module described in FIG. 3, according to some embodiments.

FIG. 4A is a simplified diagram illustrating an example structure of the TPG module 131 described in FIG. 3, according to some embodiments. The TPG module 131 receives the input of the feature representations 136, e.g., $F_i = [f_i^1, f_i^2, \ldots, f_i^{T_i}] \in \mathbb{R}^{T_i \times D}$, and is then projected to action class space via an affine transform. Per-frame scores 138, $S_i = [s_i^1, s_i^2, \ldots, s_i^{T_i}] \in \mathbb{R}^{T_i \times C}$ and $s_i^t = [s_{i1}^t, s_{i2}^t, \ldots, s_{iC}^t] \in \mathbb{R}^C$ are then generated by a fully connected layer, which indicates scores of frame t over c=1, 2, . . . , C classes. The per-frame scores 138 are then passed to the temporal softmax module 402, the temporal top-K module 404, and a thresholding module 414, in parallel.

Specifically, at temporal top-K module 404, for each class c, the top Ki frame scores are selected from the per-frame scores $S_i = [s_i^1, s_i^2, \ldots, s_i^{T_i}]$. The set of top Ki frames having the top scores for class c over all Ti frames is denoted by $\mathbb{K}_{ic}$. The parameter Ki may be set in Paul et al., Weakly-supervised temporal activity localization and classification, in proceedings of ECCV, 2018, which is hereby expressly incorporated by reference herein in its entirety.

Thus, the set of top $K_i$ frames and the associated top $K_i$ scores for each class c are passed to the averaging module 406, where for each class c, a video-level score 143 $\hat{s}_{ic}$, is obtained by average over the top Ki frame scores, as shown below:

$$\hat{s}_{ic} = \frac{1}{K_i} \Sigma_{t \in \mathbb{K}_{ic}} s_{ic}^t.$$

The video-level score 143 is then passed to a multiple instance learning (MIL) loss module 410. The MIL loss module 410 computes a cross entropy loss between the video-class label $y_i$ that is annotated with the original input video $V_i$, and the predicted video-class probability $p_i$, which is obtained by applying softmax over the video-level scores $\hat{s}_i = [\hat{s}_{ic}, \hat{s}_{ic}, \ldots, \hat{s}_{ic}]$. For example, the MIL loss 159 may be computed by:

$$L_{MIL} = -\frac{1}{|\mathbb{B}|} \Sigma_{i \in \mathbb{B}} \Sigma_{c=1}^C y_{ic} \log p_{ic},$$

where c is the class index and $\mathbb{B}$ denotes a training video batch of untrimmed videos $V_i$.

The video-level score 143 is also used in computing a co-activity similarity (CAS) loss. The CAS loss encourages regions of videos containing similar activities to have similar feature representations, and those containing different activities to have different representations. To compute the CAS loss, the video-level scores 143 are passed to a temporal softmax module 402, which generates a temporal attention vector $A_{ic} \in \mathbb{R}^{T_i}$, by applying temporal softmax over frame scores $S_i = [s_i^1, s_i^2, \ldots, s_i^{T_i}]$ at class c. The temporal attention vector 139 $A_i$ for each class c, is then multiplied with the feature representation $F_i$ 136, to produce a high-attention region feature representation vector $\Psi_{ic}$ and a low-attention region feature representation vector $\Phi_{ic}$:

$$\Psi_{ic} = F_i^T A_{ic},$$

$$\Phi_{ic} = \frac{1}{T_i - 1} F_i^T (1 - A_{ic}).$$

Specifically, $\Psi_{ic}$ aggregates features of regions with high probability containing the activity, while $\Phi_{ic}$ aggregates those of regions that are unlikely involving in the activity. For class c, a positive video pair can be defined as $V_i$ and $V_j$, if $y_{ic}=y_{jc}=1$. Their pair-wise loss is calculated as:

$$\tfrac{1}{2}\{\max(0, d(\Psi_{ic},\Psi_{jc})-d(\Psi_{ic},\Phi_{jc})+\delta)+\max(0,d(\Psi_{ic},\Psi_{jc})-d(\Phi_{ic},\Phi_{jc})+\delta)\}.$$

where d(x,y) denotes cosine similarity of vector x and y, and δ is a margin parameter. The CAS loss module 408 can then compute the CAS loss 158 using the computed pair-wise loss and information from the video-class labels 151 by taking the average loss over all the positive video pairs of all classes in the training batch:

$$L_{CAS} = \frac{1}{|W|}$$

$$\sum_{c=1}^{C} \sum_{\substack{W=\{(i,j)\in \mathbb{B} \\ y_{ic}=y_{jc}=1}} \tfrac{1}{2}\{\max(0, d(\Psi_{ic}, \Psi_{jc}) - d(\Phi_{ic}, \Psi_{jc}) + \delta) +$$

$$\max(0, d(\Psi_{ic}, \Psi_{jc}) - d(\Phi_{ic}, \Psi_{jc}) + \delta)\}.$$

The TPG module 131 may then compute a TPG loss as: $L_{TPG}=L_{CAS}+L_{MIL}$.

The video-level scores 138 may be used for proposal generation at the TPG module 131. Specifically, the video-level scores 138 are passed to a two-stage thresholding module 414. First, a threshold is used to discard categories that have small video-level confidence scores $\hat{s}_{ic}$ for each class c, e.g., when the video-level score is lower than the first threshold. Then, a second threshold is applied on the frame scores of the remaining categories, $s_i^t$, along the temporal axis, e.g., video-level scores corresponding to certain time instances that are lower than the second threshold are discarded. In this way, frames that are adjacent or closely nearby and have the same category are grouped to obtain the class-wise temporal proposals by taking advantage of temporal constraint of frames.

In one implementation, the two thresholds used by the thresholding module 414 may be determined using a similar mechanism described in Paul et al. The thresholding module 414 may then use the video-class labels 151 to filter out the proposals with wrong categories and output the temporal proposal 153.

Figure 4B:
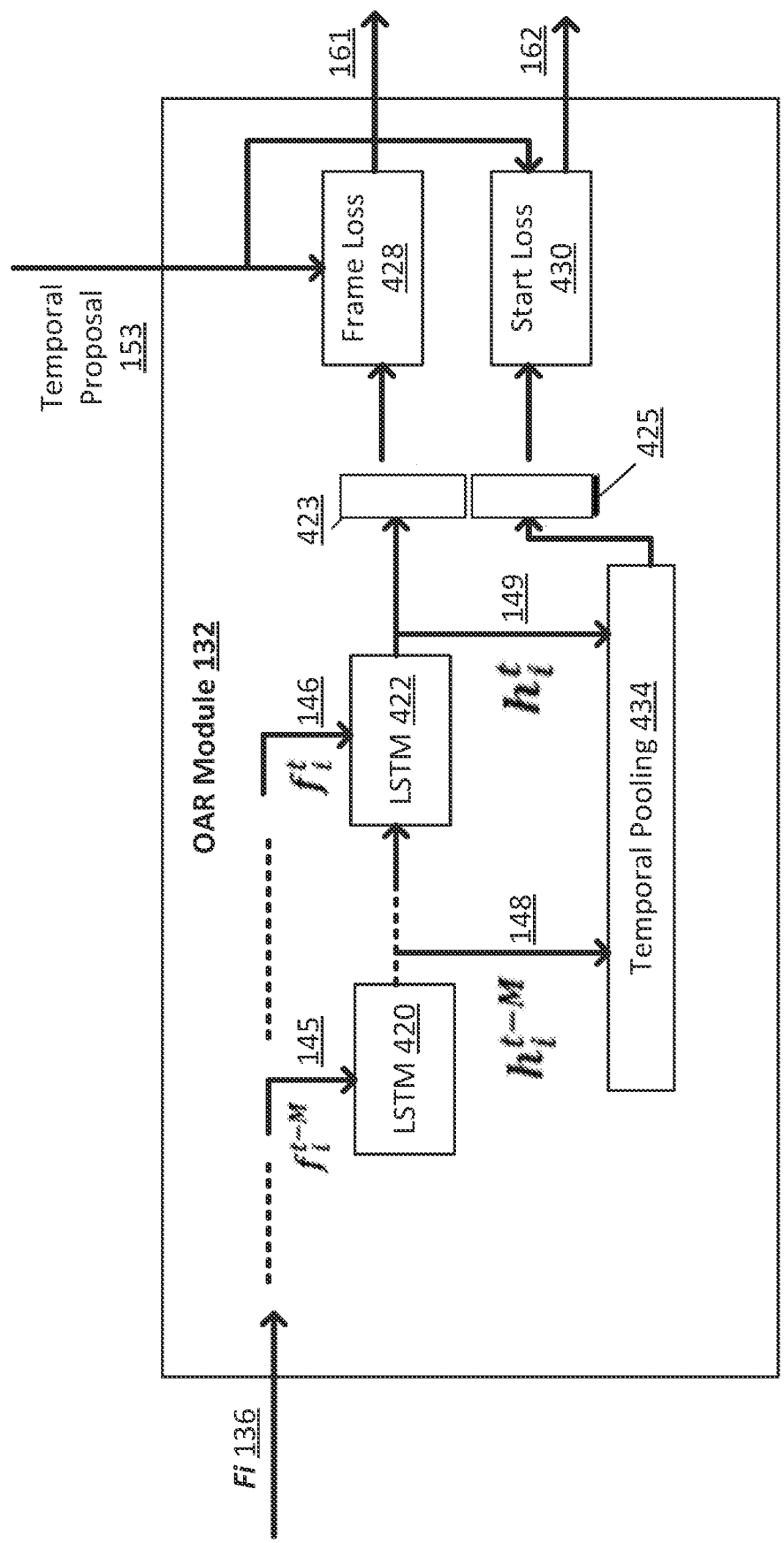
FIG. 4B is a simplified diagram illustrating an example structure of the OAR module described in FIG. 3, according to some embodiments.

FIG. 4B is a simplified diagram illustrating an example structure of the OAR module 132 described in FIG. 3, according to some embodiments. The feature representations 136 is sequentially input into the OAR module 132, e.g., each $f_i^t$ over time t, and generates per-frame action scores over classes including background, $a_i^t \in \mathbb{R}^{(C+1)}$ the probability of the current action category (online per-frame action recognition) and the class-agnostic start score, $st_i^t \in \mathbb{R}^2$, a two-dimensional vector indicating the probability of this frame being a start point and the probability that this frame is not a start point.

Specifically, the OAD module 132 includes a series of sequentially connected long short-term memories (LSTM), e.g., 420, 422, etc., each of which receives an input of the feature representation $f_i^t$ out of a period of time t−M to t. For example, the feature representation $f_i^{t-M}$ at time t−M is input to the first LSTM 420, and the feature representation $f_i^t$ is input to the last LSTM 422. Each LSTM updates its hidden and cell states, $h_i^t$ and $c_i^t$ at each time step as:

$$h_i^t, c_i^t = \text{LSTM}(h_i^{t-1}, c_i^{t-1}, f_i^t).$$

The hidden states from all LSTMs 420-422, e.g., 148-149, are then output to the temporal pooling module 434, which applies max pooling along the temporal axis from $h_i^{t-M}$ to $h_i^t$:

$$\tilde{h}_i^t = \max \text{pool}(h_i^{t-M}, h_i^{t-M+1}, \ldots, h_i^t).$$

$a_i^t$ and $st_i^t$ are then obtained by a linear projection followed by the softmax operation on $h_i^t$ and $\tilde{h}_i^t$, respectively. For example, the softmax layer 423 receives an input of $h_i^t$ and performs:

$$a_i^t = \text{softmax}(W_a^T h_i^t)$$

and the softmax layer 425 receives an input of $\tilde{h}_i^t$ from the temporal pooling module 434, and performs:

$$st_i^t = \text{softmax}(W_{st}^T \tilde{h}_i^t)$$

where $W_a^T$ and $W_{st}^T$ indicate the parameters of the classifiers.

The OAD module 132 then convert, in each training batch, the proposal boundaries 153 of each class c, received from the TPG module 131, to per-frame action labels, $l_{jc}$, and binary start labels, $\zeta_{jm}$, where j={1, 2, ..., $\tilde{T}$} indicates the index of a frame, and T is the total number of frames in the training video batch and m∈{0, 1} differentiates the non-start and start. The frame loss module 428 is then configured to compute a cross entropy loss between the per-frame action labels and the predicted action probability $a_{jc}$ as the frame loss 161:

$$L_{frame} = -\frac{1}{\tilde{T}} \Sigma_{j=1}^{\tilde{T}} \Sigma_{c=0}^{C} l_{jc} \log a_{jc}.$$

The start loss module 430 is configured to utilize focal loss between the binary start labels, $\zeta_{jm}$, and the predicted start probability, $st_{jm}$, to construct start loss 162, where $\Upsilon$ is a hyper parameter:

$$L_{start} = -\frac{1}{\tilde{T}} \sum_{j=1}^{\tilde{T}} \sum_{m=0}^{1} \zeta_{jm} (1 - st_{jm})^\gamma \log st_{jm}.$$

The OAR module 132 may then optionally compute the OAR module loss as the sum of the frame loss 161 and the start loss 162: $L_{OAR}=L_{frame}+L_{start}$. Thus, the TPG module 131 and the OAR module 132 may be jointly optimized by minimizing the total loss:

$$L_{total}=L_{OAR}+\lambda L_{TPG}.$$

where λ is a weighting parameter. During the end-to-end training, $L_{MIL}$ is computed for each video and $L_{CAS}$ is calculated using the positive video pairs in the training batch. Each video is segmented to non-overlapping training sequences which are used to calculate $L_{OAR}$.

In one implementation, the temporal proposals 153 for OAR supervision may be continuously, constantly, intermittently, or periodically updated. For example, the temporal proposals may updated periodically for every N (e.g., 500, 1000, etc.) training iterations.

In one embodiment, for the online action detection tasks, only the OAR module 132 is used during inference. Specifically, the OAR module 132 outputs $a_i^t$ and $st_i^t$ by the softmax layers 423 and 425, respectively, at each time step t. $a_i^t$ may be used directly as the per-frame action prediction. Scores of action starts, can be obtained by $as_{i(1:C)}^t = a_{i(1:C)}^t * st_{i1}^t$ and $as_{i0}^t = a_{i0}^t * st_{i0}^t$, where (1:C) indicates positive classes and (0) denotes the background, the operator "*" denotes multiplication between two vectors.

In this way, the action starts can be generated as: (1) the predicted class $\hat{c}_i^t = \text{argmax}(as_i^t)$ is an action; (2) the maximum action score $as_{i,\hat{c}_i^t}^t$ exceeds a threshold (set to be 0) and (3) $\hat{c}_i^t \neq \hat{c}_i^{t-1}$. As indicated, $st_i^t$ is used to boost the score if a start is predicted at time t and suppress those otherwise.

Figure 5:
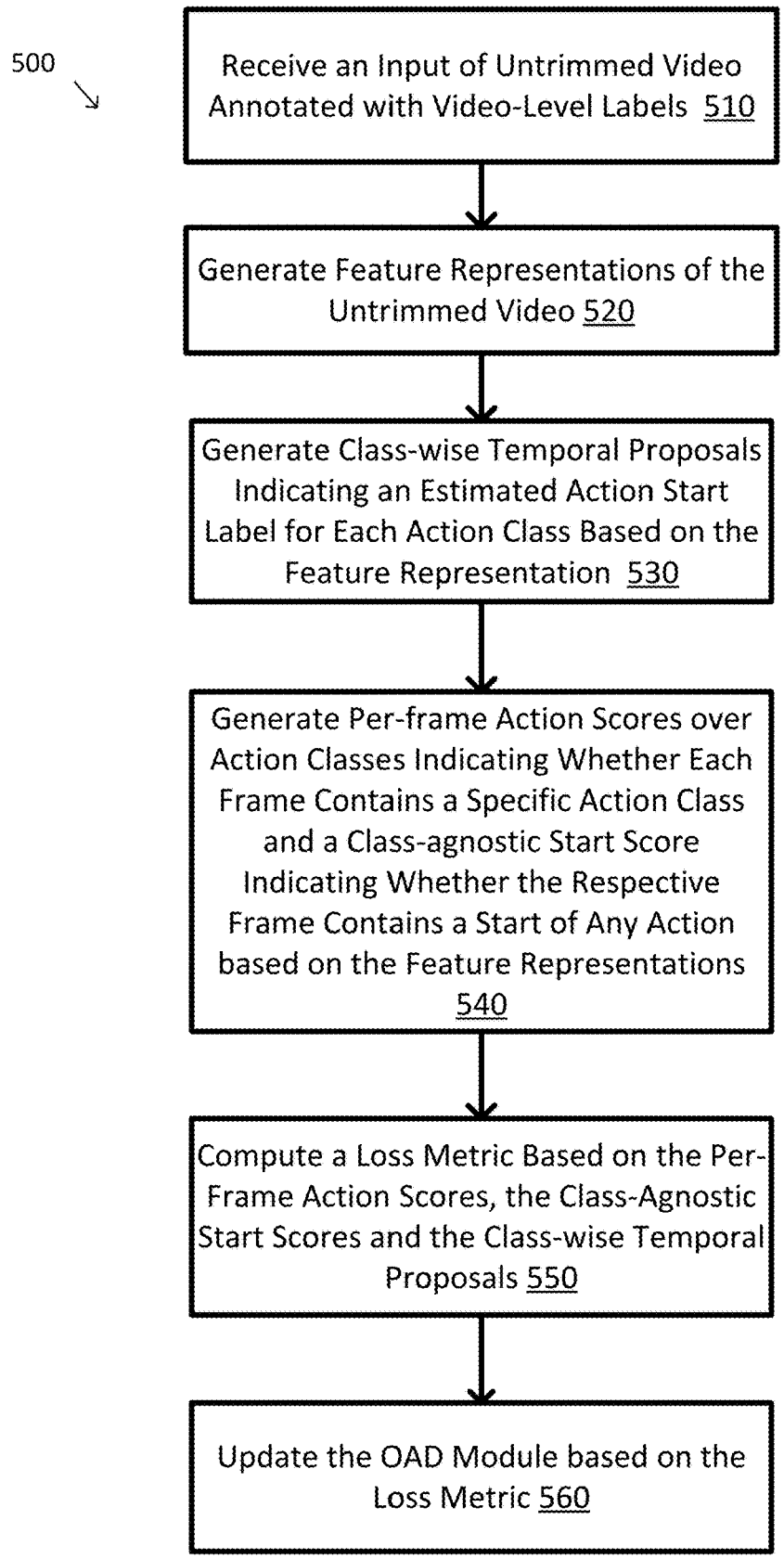
FIG. 5 is a simplified logic flow diagram illustrating a method for training an online action detection module using partially annotated data, according to some embodiments.

FIG. 5 is a simplified logic flow diagram illustrating a method for training an online action detection module using partially annotated data, according to some embodiments. One or more of the processes 510-560 of method 500 may be implemented, at least in part, in the form of executable code stored on non-transitory, tangible, machine-readable media that when run by one or more processors may cause the one or more processors to perform one or more of the processes 510-560. In some embodiments, method 500 may correspond to the method used by the partially supervised OAD module 130 for training with only video-level labels.

At step 510, an input of untrimmed video including a set of video-level annotations is received. For example, the untrimmed video may be a real-time video stream from a live application such as a surveillance system, an automatic navigation system on an autonomous vehicle, and/or the like. The input video may be received via the communication interface 115 as shown in FIG. 2.

At step 520, feature representation of the untrimmed video is generated. For example, the feature representation vector may be generated by the feature extractor 133 and the fully-connected layer 134 shown in FIG. 3. Specifically, the feature extractor may extract features of the untrimmed videos, and a fully connected layer 134 may encode the features of the untrimmed videos into the feature representations with ReLU as an activation function.

At step 530, class-wise temporal proposal may be generated from the feature representation. The class-wise temporal proposals indicate an estimated action start label for each action class. For example, the TPG module 131 may generate, for each untrimmed video with a video-level annotation, per-frame action scores for each action class using supervised offline action localization, and compute a video-level score for each action class based on the generated per-frame action scores.

In some implementations, the temporal proposal may be generated by selecting a first set of action classes corresponding to the video-level scores higher than a first threshold and applying a second threshold on a subset of the per-frame scores that corresponds to the first set of action classes along a temporal axis. The class-wise temporal proposals are obtained based temporal constraints of the subset of the per-frame scores.

At step 540, per-frame action scores over action classes indicating whether each frame contains a specific action class and a class-agnostic start score indicating whether the respective frame contains a start of any action based on the feature representations are generated. For example, at each timestep, a hidden state and a cell state of a long short-term memory is updated based on an input of the feature representations. Max pooling is then applied on a set of hidden states between a current timestep and a past timestep to obtain an average hidden state. The per-frame action scores may be generated based on the hidden state and a first vector of classifier parameters, and the class-agnostic score is generated based on the average hidden state and a second vector of classifier parameters.

At step 550, the OAD module may compute a loss metric based on the per-frame action scores, the class-agnostic start scores and the class-wise temporal proposals. For example, as discussed in relation to FIGS. 4A-4B, the loss metric includes the cross entropy between predicted video class probabilities as indicated by the temporal proposal and the video-level labels, e.g., $L_{MIL}$. In some embodiments, the loss metric includes a difference between high and low attention region aggregated feature representations, e.g., $L_{CAS}$. This loss metric encourages regions of videos containing similar activities having similar feature representations, while others containing different activities having different representations. In some embodiments, the loss metric includes a cross entropy between predicted action probabilities indicated by the action score and action labels obtained from proposal boundaries of each action class, e.g., $L_{OAR}$.

At step 560, the OAD module 130 may be updated based on the loss metric. For example, as shown in FIG. 3, the OAD module may be trained end-to-end by jointly updating the TPG module 131 and the OAR module 132, e.g., via backpropagation using the computed loss metric.

In some implementations, method 500 may be combined with supervised training of the OAD module. For example, the input videos may include a first batch of untrimmed videos having video-level annotations only, and a second batch of untrimmed videos having frame-level annotations. The OAD module may then be trained alternately by the first batch using method 500 and by the second batch supervised by the frame-level annotations.

Exemplary Performance

FIGS. 6A-6B shows data tables illustrating example performance of the OAD module using different datasets as training data, according to one embodiment. For example, two example action recognition datasets may be used, such as THUMOS'14 (Jiang et al., THUMOS challenge: Action recognition with a large number of classes, 2014) and ActivityNet1.2 (Heilbron et al., Activitynet: A large-scale video benchmark for human activity understanding, in proceedings of CVPR, 2015). THUMOS'14 contains 20 sport-related action classes. A validation set (200 videos) is used for training and evaluated on the testing set (213 videos). Each video contains 15 action instances on average. ActivityNet1.2 contains 100 action classes with an average of 1.5 action instances per video. A training set (4819 videos) is used to train the OAD module and evaluate on validation set (2383 videos). Although ActivityNet1.2 is much larger, THUMOS'14 has varying video lengths and much denser temporally annotated actions, which may provide a more challenging training scenario.

Two performance metrics, such as the frame-based average precision (F-AP) and point-based average precision (P-AP) are used. Specifically, F-AP focuses on evaluating model performance based on per-frame predictions. P-AP evaluates performance of action starts. P-AP works similarly as the bounding box based AP in the object detection task, except that P-AP uses time difference to determine whether an action start prediction is correct, while the later one uses Intersection of Union between the predicted box and the ground truth.

A baseline model for performance comparison is adopted, such as TRN (Gao et al., Temporal recurrent networks for online action detection, in proceedings of ICCV, 2019) and StarNet (Gao et al., Startnet: Online detection of action start in untrimmed videos, in proceedings of ICCV, 2019). TRN is the state-of-the-art (SOTA) method for online per-frame action recognition and StartNet is the SOTA method for online detection of starts. Both methods require segment-level (strong) annotations for training.

In one implementation, the example feature extractor (e.g., 133 in FIG. 3) is implemented on a two-stream (optical flow stream and RGB stream) I3D network pre-trained on Kinetics. Features are extracted at the chunk level. Video frames are extracted at 25 FPS and the chunk size is 16. The final features are the concatenation of the outputs of the two streams, resulting in a dimension of 2048. To perform fair comparison, both the OAD module 130 and the baselines use the pre-extracted features provided in Paul et al., W-talc: Weakly-supervised temporal activity localization and classification, in proceedings of ECCV, 2018, which is hereby expressly incorporated by reference herein in its entirety.

Example hyper-parameters of the TPG module 131 may include: the update interval of temporal proposals is set to be N=100 for THUMOS'14 and N=500 for ActivityNet. For OAR module 132, the dimension of $h_i^t$ is set to be 4096 and the length of training sequence for LSTM is 64. M in temporal pooling is fixed to be 3, and $\Upsilon$ is set to be 2. Since starts are sparsely located in each video, all positive frames are used and are randomly sampled 3 times than the negative ones in each training batch to compute start loss. $\lambda$ is fixed to be 0.5. Batch size of training videos is set to be 10. The OAD module 130 model is optimized for 4000 and 60000 iterations for THUMOS'14 and ActivityNet, respectively. The weight decay is set to be $5 \times 10^{-4}$ and set learning rate to be $1 \times 10^{-4}$.

When segment-level annotations exists, frame and start losses are computed using a combination of ground-truth and pseudo labels to improve model performance. The intuition is that the boundary annotations usually involves ambiguous decisions, so the noisy labels can serve as a type of regularization/augmentation by making the label set reasonably diverse. The combination may be conducted by randomly selecting 90% videos using segment-level supervision and other videos use the noisy proposal supervision. The proposals and the combination set are updated during training.

As shown in FIGS. 6A-6B, comparisons in terms of P-AP between OAD module 130 and the previous methods shows that when only using video-level annotations, the OAD module 130 obtains better performance than StartNet in general on both THUMOS'14 and ActivityNet. Specifically, FIG. 6A shows online detection of action start on THUMOS'14. TS indicates the two-stream features used in Shou et al., Online action detection in untrimmed, streaming videos-modeling and evaluation, in proceedings of ECCV, 2018. V and S denote video-level (weak) and segment-level (strong) supervision, respectively. The best and second-best performance per column are highlighted. FIG. 6B shows online detection of action start on ActivityNet. V and S denote video-level (weak) and segment-level (strong) supervision, respectively. The best and second-best per column are highlighted.

FIGS. 7A-7B provide example data tables illustrating performance of online per-frame action recognition, according to one embodiment. Comparisons in terms of F-AP are shown in FIGS. 7A-7B. Method 500 for the OAD module 130 achieves 54.4% mean F-AP improving the strongly-supervised TRN by 3.4% on THUMOS'14, and obtains 66.7% mean F-AP which is only 2.4% lower than TRN on ActivityNet. THUMOS'14 is a more challenging dataset, containing 10× action instances per video as compared to ActivityNet, so it leaves more room for our model to improve the performance. Hence method 500 gains much better results on THUMOS'14. Besides the model accuracy, efficiency is also important for online methods. As shown in FIG. 7A, the OAD module 130 is much smaller and faster than TRN.

Specifically, FIG. 7A shows online per-frame action recognition on THUMOS'14. The reported times do not include the processing time of feature extraction. TS indicates the two-stream features used in Xu et al., Temporal recurrent networks for online action detection, in proceedings of ICCV, 2019. V and S indicate video-level (weak) and segment-level (strong) supervision, respectively. FIG. 7B shows a comparison with ActivityNet. V+30% S means that 30% of videos have segment-level (strong) annotations and others have video-level (weak) annotations.

FIGS. 8A-8B show example performance of the OAD module trained with a combination of partial supervision and strong supervision, according to one embodiment. When using all segment-level annotations, the OAD module 130 largely outperforms TRN on THUMOS'14 (16.1% mean F-AP, see FIG. 8A). On ActivityNet, the OAD module 130 achieves new state-of-the-art performance of 70.7% mean F-AP (see FIG. 8B). For online detection of action start, the OAD module 130 outperforms StarNet consistently for all time thresholds on both THUMOS'14 (see FIG. 6A) and ActivityNet (see FIG. 6B). Interestingly, the performance gap between strong- and weak-supervision settings is only 4% mean F-AP on ActivityNet, whereas the gap is 12.7% on THUMOS'14. This may be because that the average ratio of action length over video length in ActivityNet is 43%, while the ratio is 2% in THUMOS'14.

One advantage of the OAD module 130 is the flexibility of taking different forms of supervision for different videos. Here only a portion of randomly selected videos have segment-level annotations is evaluated. As shown in FIG. 8A, the performance of OAD module 130 improves when more segment-level labels are available. On ActivityNet, the OAD module 130 achieves comparable performance to previous SOTA method when only 70% of data contains segment-level annotations.

The superior performance of OAD module 130 may attribute to (1) the improved feature representations by jointly training TPG 131 and OAR 132, (2) the effectiveness of the supervision combination strategy and (3) a desirable structure. Ablation studies are shown in FIG. 8B to analyze the effect of each component of OAD module 130.

The shared feature can be potentially improved by training TPG jointly with OAR, so that it can boost the performance of OAR. For example, as shown in FIG. 8B, disabling $L_{TPG}$ results in 5.9% lower mean F-AP and 3.5% lower mean P-AP.

In addition, as shown in FIG. 8B, using only segment-level supervision results in degradation of the mean F-AP by 3.2% and the mean P-AP@1 by 2.6%. A small amount of pseudo labels serve as a type of data augmentation thus improves model generalization. However, adding too much noise would lead to performance degradation. For example, when pseudo labels are used for 90% of videos, the mean F-AP is decreased to 58.0%.

TPG alone can also be used for online action detection, as the $S_i$ of TPG are per-frame scores for each class. As shown in FIG. 8B, using TPG results in decreasing mean F-AP and P-AP by 6.4% and 5.7%, respectively. This may due to the lack of employing temporal information of videos. TPG is constructed by feed-forward networks and trained with video-level labels. In contrast, the OAR is built upon recurrent neural networks and trained with per-frame pseudo labels that are improved by incorporating the temporal constraint of frames (see proposal generation).

FIG. 8B also illustrates the effect of start point prediction. As shown, removing $st_i^t$ results in decreasing mean P-AP by 1.7% with time threshold equals 1 second. As expected, start point prediction improves the accuracy of action start generation by suppressing false positives at non-start frames.

The hyper parameter $\lambda$ controls the contribution of the losses from the TPG and OAR modules to the total loss. $\lambda$ is set to be 0.5 as default. Method 500 is relatively robust in this hyper-parameter choice. With video-level supervision, the OAD module achieves 54.4%, 55.0% and 54.6% mean F-AP when $\lambda$ equals 0.5, 1.0 and 2.0, respectively. With strongly supervised, the OAD module 130 obtains 67.1%, 66.3% and 66.6% mean F-AP accordingly.

Models performance usually depends on the input features. The UNT (Wang et al., Untrimmednets for weakly supervised action recognition and detection, in proceedings of CVPR, 2017) feature is an improved version of the TS features. With UNT features, the OAD module 130 achieves 46.3% mean F-AP and 16.4% mean P-AP with time threshold equals 1 second. These results are much lower than those of I3D features.

In one implementation, as a byproduct, proposals of TPG can be used for offline action localization. Under the offline setting, a predicted proposal is counted as correct if its IoU with ground truth exceeds a threshold. The OAD module 130 may achieve 24.4% mAP when IoU threshold is set to be 0.5, while the baseline has 22.8%. The improvement may come from the joint training of TPG and OAR.

In one implementation, the inference times after feature extraction are compared. Different models are tested under the same environment with a single Tesla V100 GPU. The per-frame inference times of TRN, StartNet and our method averaging over the entire test set of THUMOS'14 are 2.60 ms, 0.56 ms and 0.40 ms respectively. The results suggest that the OAD module 130 achieve the fastest performance, around 6× faster than TRN. Model size is another key factor, especially for online tasks. Given similar model accuracy, smaller models are preferable, since they require less memory. Number of parameters of TRN, StartNet and our method (TPG+OAR) are 314M, 118M and 110M. The OAD module 130 has the least number of parameters (3× smaller than TRN).

Therefore, embodiments described herein address online action detection using weak or partial supervision. Previous methods rely on segment-level annotations for training which leads to significant amount of human effort and hinders the model scalability. The proposed OAD module 130 can be trained using only video-level labels and is largely improved when strong labels are available. Experimental results demonstrate that the training method (e.g., method 500) with weak supervision obtains comparable performance to the existing approaches on the online action detection tasks and outperforms the state-of-the-arts when strongly supervised.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training an online action detection (OAD) neural network model using a training dataset of untrimmed videos having video-level labels without annotated labels indicating whether a specific video frame contains an action start of a specific action class, the method comprising:

receiving, by a communication interface, an input of the training dataset of untrimmed videos including a set of video-level labels indicating one or more action classes that emerge in the untrimmed videos, wherein the untrimmed videos are used for training the OAD neural network model with no annotated label indicating action starts of the one or more action classes;

generating, by a feature extractor neural network model implemented on one or more hardware processors, feature representations from the training dataset of the untrimmed videos;

generating, by a temporal proposal generator (TPG) neural network model implemented on the one or more hardware processors and receiving the feature representations from the feature extractor neural network, class-wise temporal proposals indicating a respective estimated action start for each action class of the one or more action classes based on the feature representations and the set of video-level labels;

generating, by an online action recognizer (OAR) neural network model implemented on the one or more hardware processors and receiving the feature representations from the feature extractor neural network and the class-wise temporal proposals from the TPG neural network model, per-frame action scores over action classes indicating whether each frame of the untrimmed video contains each specific action class, and a class-agnostic start score indicating whether the respective frame contains a start of any action based on the feature representations and the class-wise temporal proposals;

training the OAD neural network model comprising the TPG neural network model and the OAR neural network model according to a loss metric computed based on the per-frame action scores, the class-agnostic start scores and based on the class-wise temporal proposals as pseudo ground-truth labels; and generating, by the trained OAD neural network model, a predicted action start for an input real-time video stream.

2. The method of claim 1, wherein the class-wise temporal proposals indicating the estimated action start for each action class are generated by:

generating, for each untrimmed video with a respective video-level annotation, per-frame action scores for each action class using supervised offline action localization problem; and computing a video-level score for each action class based on the generated per-frame action scores.

3. The method of claim 2, further comprising:

selecting a first set of action classes corresponding to the video-level scores higher than a first threshold;

applying a second threshold on a subset of the per-frame scores that corresponds to the first set of action classes along a temporal axis; and obtaining the class-wise temporal proposals based temporal constraints of the subset of the per-frame scores.

4. The method of claim 2, further comprising:

computing a predicted video-level probability based on the video-level score for each action class; and computing a multiple instance learning loss by comparing the respective video-level annotation and the predicted video-level probability.

5. The method of claim 2, further comprising:

computing a first region feature representation corresponding to a first region of an untrimmed video having a first activity level and a second region feature representation corresponding to a second region of the untrimmed video having a second activity level;

identifying, for the untrimmed video, another untrimmed video that shares a common video-level label for a specific action class with the untrimmed video; and computing a pair-wise co-activity similarity loss for the untrimmed video and the another untrimmed video based on the first region feature representation and the second region feature representation.

6. The method of claim 5, wherein the first region feature representation is computed using a temporal attention vector and a vector of the feature representations, wherein the temporal attention vector is computed by applying temporal softmax over the per-frame action scores.

7. The method of claim 1, wherein the generating the per-frame action scores and the class-agnostic start score comprises:

updating, at each timestep, a hidden state and a cell state of a long short-term memory based on an input of the feature representations;

applying max pooling on a set of hidden states between a current timestep and a past timestep to obtain an average hidden state;

generating the per-frame action scores based on the hidden state and a first vector of classifier parameters; and generating the class-agnostic score based on the average hidden state and a second vector of classifier parameters.

8. The method of claim 7, further comprising:

converting the class-wise temporal proposals to per-frame action labels and binary start labels;

computing a frame loss using a cross entropy loss between the per-frame action labels and the generated per-frame action scores; and computing a start loss using a focal loss between the binary start labels and the generated class-agnostic score.

9. The method of claim 8, wherein the loss metric is computed by a weighted sum of an online action recognizer loss and a temporal proposal generator loss, wherein the online action recognizer loss includes a sum of the frame loss and the start loss, and wherein the temporal proposal generator loss includes a multiple instance learning loss and a pair-wise co-activity similarity loss.

10. The method of claim 9, wherein the input of untrimmed videos comprises a first untrimmed video having video-level annotations only, and a second untrimmed video having frame-level annotations, and wherein the OAD neural network model is trained by a combination of the first untrimmed video, and the second untrimmed video supervised by the frame-level annotations.

11. A system for training an online action detection (OAD) neural network model using a training dataset of untrimmed videos having video-level labels without annotated labels indicating whether a specific video frame contains an action start of a specific action class, the system comprising:

a communication interface that receives an input of the training dataset of untrimmed videos including a set of video-level labels indicating one or more action classes that emerge in the untrimmed videos, wherein the untrimmed videos are used for training the OAD neural network model with no annotated label indicating action starts of the one or more action classes;

a memory storing a feature extractor neural network model, a temporal proposal generator (TPG) neural network model and the OAD neural network model, and a plurality of processor-executable instructions; and a processor reading from the memory and executing the plurality of processor-executable instructions to:

generate, by a feature extractor neural network model implemented on one or more hardware processors, feature representations from the input of the untrimmed videos;

generate, by a temporal proposal generator (TPG) neural network model implemented on the one or more hardware processors and receiving the feature representations from the feature extractor neural network, class-wise temporal proposals indicating a respective estimated action start for each action class of the one or more action classes based on the feature representations and the set of video-level labels;

generate, by an online action recognizer (OAR) neural network model implemented on the one or more hardware processors and receiving the feature representations from the feature extractor neural network and the class-wise temporal proposals from the TPG neural network model, per-frame action scores over action classes indicating whether each frame of the untrimmed video contains each specific action class, and a class-agnostic start score indicating whether the respective frame contains a start of any action based on the feature representations and the class-wise temporal proposals;

train the OAD neural network model comprising the TPG neural network model and the OAR neural network model according to a loss metric computed based on the per-frame action scores, the class-agnostic start scores and based on the class-wise temporal proposals as pseudo ground-truth labels; and generate, by the trained OAD neural network model, a predicted action start for an input real-time video stream.

12. The system of claim 11, wherein the class-wise temporal proposals indicating an estimated action start label for each action class are generated by:

generating, for each untrimmed video with a respective video-level annotation, per-frame action scores for each action class using supervised offline action localization problem; and computing a video-level score for each action class based on the generated per-frame action scores.

13. The system of claim 12, wherein the processor is further configured to:

select a first set of action classes corresponding to the video-level scores higher than a first threshold;

apply a second threshold on a subset of the per-frame scores that corresponds to the first set of action classes along a temporal axis; and obtain the class-wise temporal proposals based temporal constraints of the subset of the per-frame scores.

14. The system of claim 12, wherein the processor is further configured to:

compute a predicted video-level probability based on the video-level score for each action class; and compute a multiple instance learning loss by comparing the respective video-level annotation and the predicted video-level probability.

15. The system of claim 12, wherein the processor is further configured to:

compute a first region feature representation corresponding to a first region of an untrimmed video having a first activity level and a second region feature representation corresponding to a second region of the untrimmed video having a second activity level;

identify, for the untrimmed video, another untrimmed video that shares a common video-level label for a specific action class with the untrimmed video; and compute a pair-wise co-activity similarity loss for the untrimmed video and the another untrimmed video based on the first region feature representation and the second region feature representation.

16. The system of claim 15, wherein the first region feature representation is computed using a temporal attention vector and a vector of the feature representations, wherein the temporal attention vector is computed by applying temporal softmax over the per-frame action scores.

17. The system of claim 11, wherein the generating the per-frame action scores and the class-agnostic start score comprises:

updating, at each timestep, a hidden state and a cell state of a long short-term memory based on an input of the feature representations;

applying max pooling on a set of hidden states between a current timestep and a past timestep to obtain an average hidden state;

generating the per-frame action scores based on the hidden state and a first vector of classifier parameters; and generating the class-agnostic score based on the average hidden state and a second vector of classifier parameters.

18. The system of claim 17, wherein the processor is further configured to:

convert the class-wise temporal proposals to per-frame action labels and binary start labels;

compute a frame loss using a cross entropy loss between the per-frame action labels and the generated per-frame action scores; and compute a start loss using a focal loss between the binary start labels and the generated class-agnostic score.

19. The system of claim 18, wherein the loss metric is computed by a weighted sum of an online action recognizer loss and a temporal proposal generator loss, wherein the online action recognizer loss includes a sum of the frame loss and the start loss, and wherein the temporal proposal generator loss includes a multiple instance learning loss and a pair-wise co-activity similarity loss.

20. A non-transitory processor-readable storage medium storing a feature extractor neural network model, a temporal proposal generator (TPG) neural network model and the OAD neural network model and processor-executable instructions for training the OAD neural network model using a training dataset of untrimmed videos having video-level labels without annotated labels indicating whether a specific video frame contains an action start of a specific action class, the processor-executable instructions executable by a processor to perform:

receiving, by a communication interface, an input of the training dataset of untrimmed videos including a set of video-level labels indicating one or more action classes that emerge in the untrimmed videos, wherein the untrimmed videos are used for training the OAD neural network model with no annotated label indicating action starts of the one or more action classes;

generating, by a feature extractor neural network model implemented on one or more hardware processors, feature representations from the training dataset of the untrimmed videos;

generating, by a temporal proposal generator (TPG) neural network model implemented on the one or more hardware processors and receiving the feature representations from the feature extractor neural network, class-wise temporal proposals indicating a respective estimated action start for each action class of the one or more action classes based on the feature representations and the set of video-level labels;

generating, by an online action recognizer (OAR) neural network model implemented on the one or more hardware processors and receiving the feature representations from the feature extractor neural network and the class-wise temporal proposals from the TPG neural network model, per-frame action scores over action classes indicating whether each frame of the untrimmed video contains each specific action class, and a class-agnostic start score indicating whether the respective frame contains a start of any action based on the feature representations and the class-wise temporal proposals;

training the OAD neural network model comprising the TPG neural network model and the OAR neural network model according to a loss metric computed based on the per-frame action scores, the class-agnostic start scores and based on the class-wise temporal proposals as pseudo ground-truth labels; and generating, by the trained OAD neural network model, a predicted action start for an input real-time video stream.

\* \* \* \* \*